United States Patent
Idrizovic et al.

(10) Patent No.: US 12,086,235 B2
(45) Date of Patent: Sep. 10, 2024

(54) EARLY EXIT DYNAMIC ANALYSIS OF A VIRTUAL MACHINE

(71) Applicant: Palo Alto Networks, Inc., Santa Clara, CA (US)

(72) Inventors: Esmid Idrizovic, Trumau (AT); Daniel Raygoza, Seattle, WA (US); Robert Jung, Albuquerque, NM (US); Michael S. Hughes, Davenport, FL (US)

(73) Assignee: Palo Alto Networks, Inc., Santa Clara, CA (US)

( * ) Notice: Subject to any disclaimer, the term of this patent is extended or adjusted under 35 U.S.C. 154(b) by 169 days.

(21) Appl. No.: 17/364,697

(22) Filed: Jun. 30, 2021

(65) Prior Publication Data

US 2023/0004639 A1 Jan. 5, 2023

(51) Int. Cl.
*G06F 21/53* (2013.01)
*G06F 21/56* (2013.01)

(52) U.S. Cl.
CPC ............ *G06F 21/53* (2013.01); *G06F 21/566* (2013.01); *G06F 2221/033* (2013.01)

(58) Field of Classification Search
CPC ... G06F 21/53; G06F 21/566; G06F 2221/033
See application file for complete search history.

(56) References Cited

U.S. PATENT DOCUMENTS

| | | | | |
|---|---|---|---|---|
| 9,165,136 | B1 * | 10/2015 | VanLund | G06F 9/45558 |
| 9,479,531 | B1 * | 10/2016 | Watson | G06F 21/566 |
| 10,360,371 | B1 * | 7/2019 | Watson | G06F 21/50 |
| 10,515,214 | B1 * | 12/2019 | Vincent | G06F 21/562 |
| 2011/0247072 | A1 * | 10/2011 | Staniford | H04L 63/1491 726/24 |
| 2016/0048683 | A1 * | 2/2016 | Sanders | H04L 63/145 726/23 |
| 2016/0366100 | A1 * | 12/2016 | Liu | G06F 21/552 |
| 2018/0048660 | A1 * | 2/2018 | Paithane | G06F 21/566 |

OTHER PUBLICATIONS

Lin et al., Efficient Dynamic Malware Analysis using Virtual Time Control Mechanics, Computers & Security 73 (2018), pp. 359-373.
O'Kane et al., Detecting Obfuscated Malware Using Reduced Opcode Set and Optimised Runtime Trace, Security Informatics, 2016.
Or-Meir et al., Dynamic Malware Analysis in the Modern Era—A State of the Art Survey, ACM Computing Surveys, vol. 52, No. 5, Article 88, Sep. 2019.
Yoshihiro Oyama, Skipping Sleeps in Dynamic Analysis of Multithreaded Malware, IEEE, 2018.

* cited by examiner

*Primary Examiner* — Trong H Nguyen
(74) *Attorney, Agent, or Firm* — Van Pelt, Yi & James LLP

(57) ABSTRACT

Techniques for early exit dynamic analysis of a virtual machine are disclosed. In some embodiments, a system/process/computer program product for early exit dynamic analysis of a virtual machine includes initiating a dynamic analysis of a malware sample by executing the malware sample in a virtual computing environment; monitoring activities of the malware sample during execution of the malware sample in the virtual computing environment; and determining when to exit the dynamic analysis before a predetermined period of time.

18 Claims, 14 Drawing Sheets

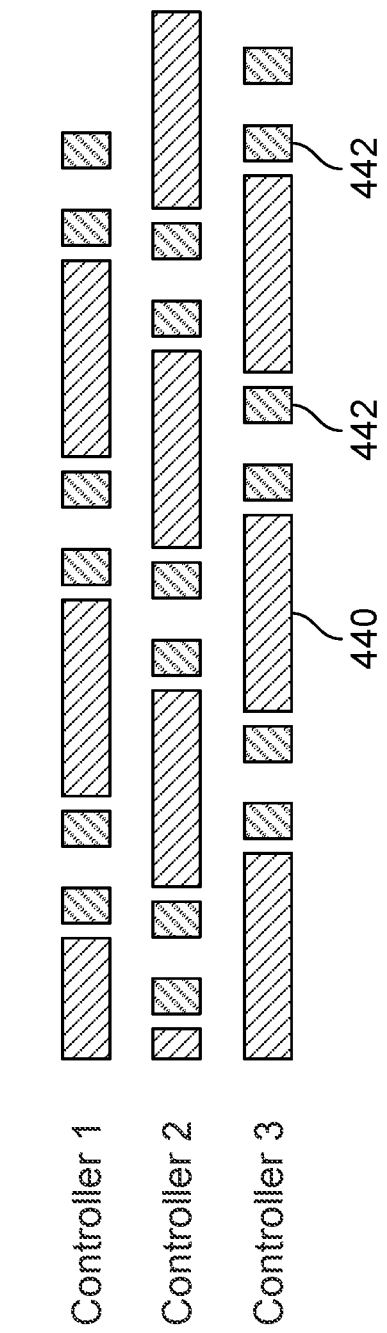

2021-04-16 02:17:37, 326 DEBUG CoreHandler: Process created: C:\Users\Administrator\WhUGhXPrUYRK.exe (1668, ppid: 1472), cmd: C:\Users\Administrator\WhUGhXPrUYRK.exe
2021-04-16 02:17:37, 607 DEBUG CoreHandler: Process terminated: C:\Windows\system32\cmd.exe (1472)
2021-04-16 02:17:39, 364 DEBUG CoreHandler: Process created: \??\C:\Windows\system32\conhost.exe (1340, ppid: 380), cmd: \??\C:\Windows\system32\conhost.exe
2021-04-16 02:17:39, 493 DEBUG CoreHandler: Process terminated: C:\Windows\system32\conhost.exe (1512)
2021-04-16 02:17:41, 736 DEBUG MemoryCaptureFeature: Saving pages Entry point for C:\Users\Administrator\WhUGhXPrUYRK.exe (1668): PEB: 0x7efdf000, ProcessHeaps: 0x77a6a6
2021-04-16 02:17:53, 463 DEBUG CoreHandler: Process terminated: C:\Users\Administrator\WhUGhXPrUYRK.exe (1668)
2021-04-16 02:17:55, 076 DEBUG MemoryCaptureFeature: Saving pages Terminated for C:\Users\Administrator\WhUGhXPrUYRK.exe (1668): PEB: 0x7efdf000, ProcessHeaps: 0x77a6a6
2021-04-16 02:17:55, 264 DEBUG CoreHandler: Process terminated: C:\Windows\system32\conhost.exe (1340)
2021-04-16 02:17:55, 264 DEBUG EarlyExit: Disabling monitoring because of inactivity.
2021-04-16 02:17:55, 264 INFO CoreHandler: Disabled monitoring. Execution time 0:00:45.868766

FIG. 7A

2021-04-16 02:23:13,360 DEBUG CoreHandler: Process created: C:\Users\Administrator\bvYgNJPqCwwhAbLW.exe (1576, ppid: 1476), cmd: C:\Users\Administrator\bvYgNJPqCwwhAbLW.exe 2021-04-16 02:23:13,647 DEBUG CoreHandler: Process terminated: C:\Windows\system32\cmd.exe (1476)

2021-04-16 02:23:16,893 DEBUG MemoryCaptureFeature: Saving pages Entry point for C:\Users\Administrator\bvYgNJPqCwwhAbLW.exe (1576): PEB: 0x7efdf000, ProcessHeaps: 0x7713a6c0, PEB_LDR_DATA: 0x77132640, WOW64 PEB: 0x7efde000, 2021-04-16 02:23:17,509 DEBUG MemoryCaptureFeature: Saving pages Unpacking_Detected for C:\Users\Administrator\bvYgNJPqCwwhAbLW.exe (1576): PEB: 0x7efdf000, ProcessHeaps: 0x7713a6c0, PEB_LDR_DATA: 0x77132640, WOW64 PEB: 0x7e 2021-04-16 02:23:18,254 DEBUG DetectGuestHooks: Enabling additional handler in detect_hooks.

2021-04-16 02:23:18,507 DEBUG CoreHandler: Process terminated: C:\Windows\system32\conhost.exe (1516)

2021-04-16 02:23:28,478 DEBUG CoreHandler: Process created: C:\Users\Administrator\bvYgNJPqCwwhAbLW.exe (1108, ppid: 1576), cmd: "C:\Users\Administrator\bvYgNJPqCwwhAbLW.exe"

2021-04-16 02:23:29,832 DEBUG FollowCodeInjection: Process C:\Users\Administrator\bvYgNJPqCwwhAbLW.exe (1576) is injecting a thread into C:\Users\Administrator\bvYgNJPqCwwhAbLW.exe (PID: 1108, TID: 1480) (NtResumeThread)

2021-04-16 02:23:29,832 DEBUG CoreHandler: Installing all hooks in C:\Users\Administrator\bvYgNJPqCwwhAbLW.exe (Injection)

2021-04-16 02:23:30,418 DEBUG MemoryCaptureFeature: Saving pages Initial for C:\Users\Administrator\bvYgNJPqCwwhAbLW.exe (1108): PEB: 0x7efdf000, ProcessHeaps: 0x7efdf380, PEB_LDR_DATA: 0x77132640, WOW64 PEB: 0x7efde000, WOW 2021-04-16 02:23:33,319 DEBUG MemoryCaptureFeature: Saving pages Unpacking_Detected for C:\Users\Administrator\bvYgNJPqCwwhAbLW.exe (1108): PEB: 0x7efdf000, ProcessHeaps: 0x7713a6c0, PEB_LDR_DATA: 0x77132640, WOW64 PEB: 0x7e 2021-04-16 02:23:37,748 DEBUG CoreHandler: Process created: C:\Windows\System32\mobsync.exe (1336, ppid: 584), cmd: C:\Windows\System32\mobsync.exe -Embedding 2021-04-16 02:23:39,523 DEBUG CoreHandler: Process terminated: C:\Users\Administrator\bvYgNJPqCwwhAbLW.exe (1576)

2021-04-16 02:23:40,145 DEBUG MemoryCaptureFeature: Saving pages Terminated for C:\Users\Administrator\bvYgNJPqCwwhAbLW.exe (1576): PEB: 0x7efdf000, ProcessHeaps: 0x7713a6c0, PEB_LDR_DATA: 0x77132640, WOW64 PEB: 0x7efde000, 2021-04-16 02:23:41,179 DEBUG CoreHandler: Process terminated: C:\Users\Administrator\bvYgNJPqCwwhAbLW.exe (1108)

2021-04-16 02:23:41,783 DEBUG MemoryCaptureFeature: Saving pages Terminated for C:\Users\Administrator\bvYgNJPqCwwhAbLW.exe (1108): PEB: 0x7efdf000, ProcessHeaps: 0x7713a6c0, PEB_LDR_DATA: 0x77132640, WOW64 PEB: 0x7efde000, 2021-04-16 02:23:43,209 DEBUG CoreHandler: Process terminated: C:\Windows\System32\mobsync.exe (1336)

2021-04-16 02:23:43,209 DEBUG EarlyExit: Disabling monitoring because of inactivity.

2021-04-16 02:23:43,210 INFO CoreHandler: Disabled monitoring. Execution time 0:00:54.926382

FIG. 7B 2021-04-16 06:36:33,010 DEBUG CoreHandler: Process created: C:\Users\Administrator\lKNhVjqe.exe (1836, ppid: 1504), cmd: C:\Users\Administrator\lKNhVjqe.exe
2021-04-16 06:36:33,286 DEBUG CoreHandler: Process terminated: C:\Windows\system32\cmd.exe (1504)
2021-04-16 06:36:34,995 DEBUG CoreHandler: Process created: \??\C:\Windows\system32\conhost.exe (1044, ppid: 380), cmd: \??\C:\Windows\system32\conhost.exe
2021-04-16 06:36:35,146 DEBUG CoreHandler: Process terminated: C:\Windows\system32\conhost.exe (1540)
2021-04-16 06:36:37,513 DEBUG MemoryCaptureFeature: Saving pages Entry point for C:\Users\Administrator\lKNhVjqe.exe (1836); PEB: 0x7efdf000, ProcessHeaps: 0x776da6c0, PEB_LDR_DATA: 0x776d2640, WOW64 PEB: 0x7efde000, WOW64 ProcessHeaps: 0x77884740, WOW64 PEB_LDR_DATA: 0x77880200.
2021-04-16 06:36:39,063 DEBUG CoreHandler: Process created: C:\windows\SysWOW64\schtasks.exe (1080, ppid: 1836), cmd: C:\windows\system32\schtasks.exe /create /F /sc once /st "07:37:36" /tn "WildFireTest" /tr C:\test_wf.vbs
2021-04-16 06:36:40,120 DEBUG CoreHandler: Process terminated: C:\Users\Administrator\lKNhVjqe.exe (1836)
2021-04-16 06:36:41,097 DEBUG ConsoleOutput: Console output for C:\Users\Administrator\lKNhVjqe.exe (1836): Time: 07:37:36
2021-04-16 06:36:41,408 DEBUG MemoryCaptureFeature: Saving pages Terminated for C:\Users\Administrator\lKNhVjqe.exe (1836); PEB: 0x7efdf000, ProcessHeaps: 0x776da6c0, PEB_LDR_DATA: 0x776d2640, WOW64 PEB: 0x7efde000, WOW64 ProcessHeaps: 0x77884740, WOW64 PEB_LDR_DATA: 0x77880200.
2021-04-16 06:36:43,039 DEBUG CoreHandler: Process created: C:\Windows\SysWOW64\schtasks.exe (1080)
2021-04-16 06:36:43,173 DEBUG CoreHandler: Process terminated: C:\Windows\system32\conhost.exe (1044)
2021-04-16 06:36:47,915 DEBUG CoreHandler: Process created: C:\Windows\System32\mobsync.exe (1116, ppid: 584), cmd: C:\Windows\system32\mobsync.exe -Embedding
2021-04-16 06:36:51,856 DEBUG CoreHandler: Process terminated: C:\Windows\System32\mobsync.exe (1116)
2021-04-16 06:36:52,495 DEBUG CoreHandler: Process created: C:\Windows\system32\taskeng.exe (1728, ppid: 868), cmd: taskeng.exe {7CF3F13B-E3B7-4D0D-AC72-12928291ID70} S-1-5-21-3946836232-3129958654-3972794008-500: JOHNS-PC\Administrator:Interactive:[1]
2021-04-16 06:36:53,573 DEBUG CoreHandler: Process created: C:\Windows\System32\WScript.exe (1696, ppid: 1728), cmd: C:\Windows\System32\WScript.exe "C:\test_wf.vbs"
2021-04-16 06:36:56,248 DEBUG MemoryCaptureFeature: Saving pages Entry point for C:\Windows\System32\WScript.exe (1696); PEB: 0x7ffffdf000, ProcessHeaps: 0x776da6c0, PEB_LDR_DATA: 0x776d2640.
2021-04-16 06:37:00,361 DEBUG CoreHandler: Disabled breakpoint ntdll.dll!NtQueryKey (x64) in C:\Windows\System32\WScript.exe (1696)
2021-04-16 06:37:02,393 DEBUG CoreHandler: Disabled breakpoint ntdll.dll!NtQueryValueKey (x64) in C:\Windows\System32\WScript.exe (1696)
2021-04-16 06:37:02,906 DEBUG CoreHandler: Process terminated: C:\Windows\System32\WScript.exe (1696)
2021-04-16 06:37:03,532 DEBUG MemoryCaptureFeature: Saving pages Terminated for C:\Windows\System32\WScript.exe (1696); PEB: 0x7ffffdf000, ProcessHeaps: 0x776da6c0, PEB_LDR_DATA: 0x776d2640.
2021-04-16 06:37:15,005 DEBUG CoreHandler: Process created: C:\Windows\Microsoft.NET\Framework\v4.0.30319\mscorsvw.exe (1920, ppid: 464), cmd: C:\Windows\Microsoft.NET\Framework\v4.0.30319\mscorsvw.exe
2021-04-16 06:37:15,655 DEBUG CoreHandler: Process terminated: C:\Windows\Microsoft.NET\Framework\v4.0.30319\mscorsvw.exe (1920)
2021-04-16 06:37:15,656 DEBUG EarlyExit: Disabling monitoring because of inactivity.
2021-04-16 06:37:15,656 INFO CoreHandler: Disabled monitoring. Execution time 0:01:07.572419
2021-04-16 06:37:15,692 DEBUG PyVirtualMachine: Exiting VM loop
2021-04-16 06:37:16,058 INFO NetworkCaptureInterface: Network capture stopped

FIG. 7C 2021-04-16 06:36:33,010 Process created: C:\Users\Administrator\sample.exe (1836, ppid: 1504), cmd: C:\Users\Administrator\sample.exe
2021-04-16 06:36:39,063 Process created: C:\windows\SysWOW64\schtasks.exe (1080, ppid: 1836), cmd: C:\windows\system32\schtasks.exe /create /F /        /st "07:37:36" /tn "WildFireTest" /tr C:\test_wf.vbs
2021-04-16 06:36:40,120 Process terminated: C:\Users\Administrator\sample.exe (1836)
2021-04-16 06:36:41,097 ConsoleOutput: Console output for C:\Users\Administrator\sample.exe (1836): Time: 07:37:36
2021-04-16 06:36:43,039 Process terminated: C:\windows\SysWOW64\schtasks.exe (1080)

...

2021-04-16 06:36:52,495 Process created: C:\Windows\system32\taskeng.exe (1728, ppid: 868), cmd: taskeng.exe {7CF3F13B-E3B7-4D0D-AC72-129282911D70} S-1-5-21-3946836232-3129958654-3972794008-500:JOHNS-PC\Administrator:Interactive:[1]
2021-04-16 06:36:53,573 Process created: C:\Windows\System32\WScript.exe (1696, ppid: 1728), cmd: C:\Windows\System32\WScript.exe "C:\test_wf.vbs"
2021-04-16 06:37:02,906 Process terminated: C:\Windows\System32\WScript.exe (1696)

...

2021-04-16 06:37:15,656 EarlyExit: Disabling monitoring because of inactivity.
2021-04-16 06:37:15,656 Disabled monitoring. Execution time 0:01:07.572419

FIG. 7D

EARLY EXIT DYNAMIC ANALYSIS OF A VIRTUAL MACHINE

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware attempt to pack or otherwise obfuscate the malicious code to evade detection by firewalls, host security software, and/or virtualized malware analysis. Further, malware authors are using increasingly sophisticated techniques to pack/obfuscate the workings of their malicious software.

BRIEF DESCRIPTION OF THE DRAWINGS

Various embodiments of the invention are disclosed in the following detailed description and the accompanying drawings.

FIGS. 4A-D illustrate the inefficient use of computing resources for dynamic analysis performed for a predetermined period of time.

FIG. 7A illustrates a log of the monitored activities during dynamic analysis of a sample in accordance with some embodiments.

FIG. 7B illustrates a log of the monitored activities during dynamic analysis of another sample in accordance with some embodiments.

FIGS. 7C-D illustrate a log of the monitored activities during dynamic analysis of a sample in accordance with some embodiments.

DETAILED DESCRIPTION

Figure 1:
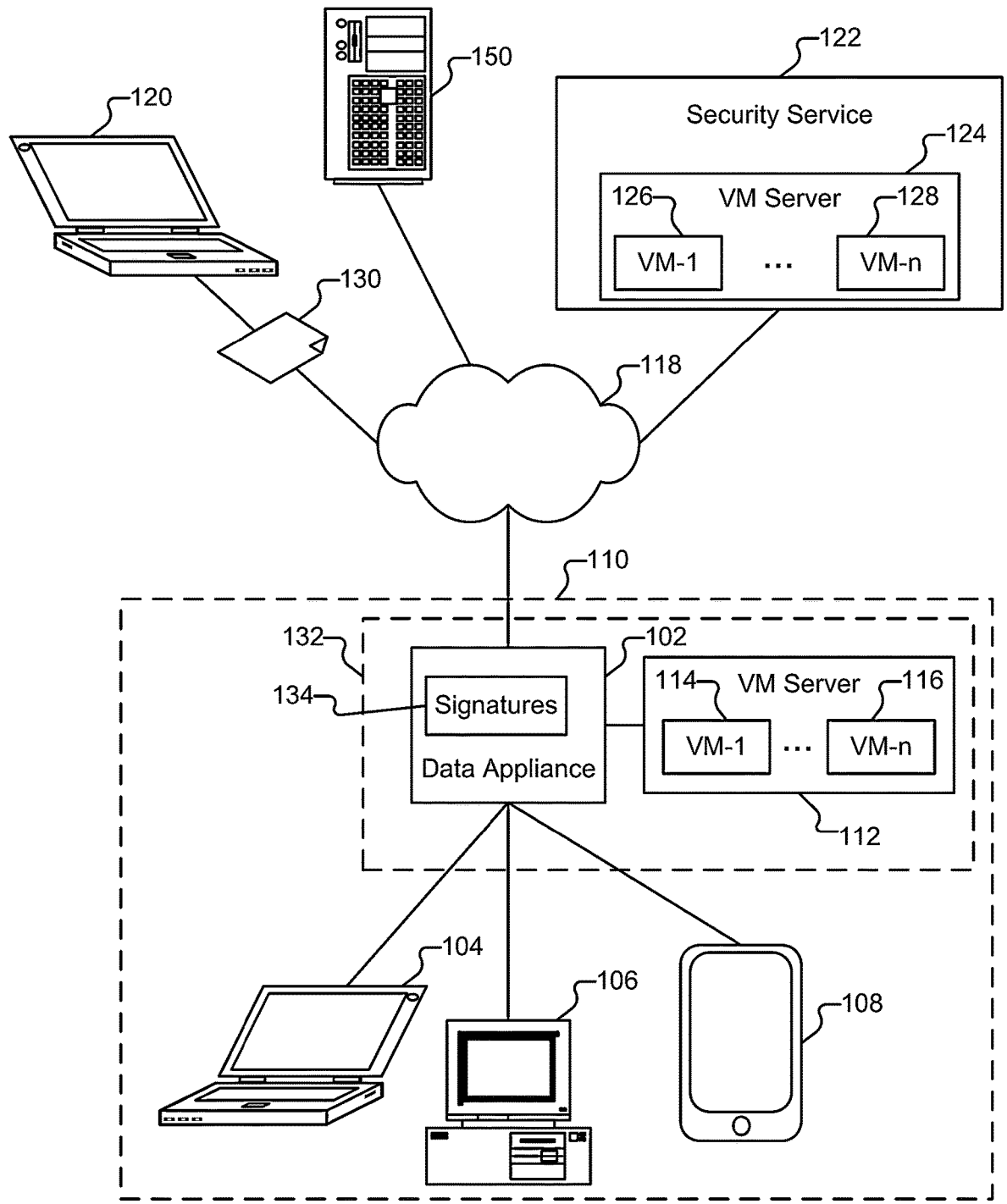
FIG. 1 illustrates an example of an environment in which malware is detected and its harm reduced in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some types of malware attempt to pack or otherwise obfuscate the malicious code to evade detection by firewalls, host security software (e.g., host security software/agents), and/or virtualized malware analysis that is based on static analysis. Unfortunately, malware authors are using increasingly sophisticated techniques to pack/obfuscate the workings of their malicious software. As such, there exists an ongoing need for improved techniques to detect malware using dynamic analysis and prevent its harm.

As an example, the deobfuscated or unpacked binaries (e.g., binary code, also referred to herein as code) typically include the malicious payload that is executed at runtime, which is concealed/kept hidden and only decoded/decompressed and/or decrypted at runtime (e.g., in memory) when needed in an attempt to avoid malware detection with existing malware detection techniques. This obfuscation/packing approach has become common practice for malware authors because such can evade detection of their malicious payloads and/or make such detection significantly more difficult (e.g., if the deobfuscated/unpacked malicious payload is not stored on disk (to evade host security detection) and is not transferred across networks (to evade network security/firewall detection)). As such, new techniques are needed to facilitate efficient and effective detection using improved dynamic analysis of samples (e.g., malware samples, which can include obfuscated or packed malware binary code that can be, for example, encoded/obfuscated, encrypted, compressed, and/or other combinations and approaches can be used by malware authors for obfuscating/packing malware binary code, as well as other forms of malware).

Overview of Techniques for Early Exit Dynamic Analysis of a Virtual Machine

However, performing dynamic analysis of a sample in a virtual computing environment (e.g., using a virtual machine instance (VM)) is typically performed for a fixed period of time (e.g., five minutes or some other fixed period of time). But in many cases the sample may not run or may exit prior to expiration of that predetermined period of time. In such cases, the dynamic analysis is inefficient as computing resources (e.g., CPU, memory, and computing time) are wasted during the remainder of that time period for which there is no further information that can be gleaned during such dynamic analysis of these samples. Accordingly, new techniques are disclosed for determining when we can terminate the dynamic analysis prior to the end of the predetermined period (e.g., perform early exit dynamic analysis of the sample in the virtual computing environment) to provide an effective and efficient detection using improved dynamic analysis of samples in a virtual computing environment.

Dynamic Analysis (DA) in a virtual computing environment (e.g., VM) generally allocates a fixed window of time per sample (e.g., one, five, or ten minutes or some other predetermined period of time). However, as discussed above, the full period of time is often not required to effectively perform the dynamic analysis on the sample. For example, a given sample may not require the full predetermined period of time for performing the dynamic analysis in various cases, such as the following: (1) the sample is broken and as such will not execute in the virtual computing environment; (2) the sample requires external dependencies (e.g., and the virtual computing environment does not have the relevant external dependencies, such as files, etc.); (3) the sample may have unsupported file sub-types; and/or (4) the dynamic analysis may have effectively completed prior to the expiration of the predetermined period of time (e.g., the sample was executed and terminated without performing any other activities that would require further dynamic analysis, such as further described below).

Thus, what is needed are new and improved techniques for performing efficient and effective detection using improved dynamic analysis of samples. However, as discussed above, performing a reliable determination of when a sample has 'finished' is technically challenging.

Accordingly, techniques for early exit dynamic analysis of a virtual machine are disclosed. For example, techniques for early exit dynamic analysis of a virtual machine can be applied to address more efficiently and effectively some of the computer security technological challenges and problems that are associated with performing a dynamic analysis of samples.

In some embodiments, a system/process/computer program product for early exit dynamic analysis of a virtual machine includes initiating a dynamic analysis of a malware sample by executing the malware sample in a virtual computing environment (e.g., execution of the malware sample in an instrumented virtualized execution environment, such as a virtual machine (VM) instance, which can be allowed to execute in the instrumented virtualized execution environment for one, five, ten minutes, or some other period of time, or until an early exit is performed, such as described herein); monitoring activities of the malware sample (e.g., launching a new process; writing, copying, or moving a file; changing a registry setting; modifying a system service; and/or scheduling a task) during execution of the malware sample in the virtual computing environment; and determining when to exit the dynamic analysis before a predetermined period of time. For example, an early exit from the dynamic analysis before a predetermined period of time can be performed based on a termination of a main process associated with executing the malware sample in the virtual computing environment. The output of the monitored activities of the malware sample during execution of the malware sample (e.g., generated as a dynamic analysis (DA) report) in the virtual computing environment is also automatically analyzed to determine whether the malware sample is malicious or benign.

In some embodiments, a system/process/computer program product for early exit dynamic analysis of a virtual machine further includes monitoring memory during execution of the malware sample in the virtual computing environment.

In some embodiments, a system/process/computer program product for early exit dynamic analysis of a virtual machine includes monitoring for launching a new process during execution of the malware sample in the virtual computing environment.

In some embodiments, a system/process/computer program product for early exit dynamic analysis of a virtual machine includes monitoring for writing, copying, or moving a file during execution of the malware sample in the virtual computing environment.

In some embodiments, a system/process/computer program product for early exit dynamic analysis of a virtual machine includes monitoring for changing a registry setting during execution of the malware sample in the virtual computing environment.

In some embodiments, a system/process/computer program product for early exit dynamic analysis of a virtual machine includes monitoring for modifying a system service during execution of the malware sample in the virtual computing environment.

In some embodiments, a system/process/computer program product for early exit dynamic analysis of a virtual machine includes monitoring for scheduling a task during execution of the malware sample in the virtual computing environment.

In some embodiments, a system/process/computer program product for early exit dynamic analysis of a virtual machine includes performing an early exit of the dynamic analysis of the malware sample before the predetermined period of time based on monitoring of the malware sample during execution in the virtual computing environment (e.g., to determine that the malware sample has completed execution and no further dynamic analysis is to be performed to determine whether the malware sample is malicious or benign).

In some embodiments, a system/process/computer program product for early exit dynamic analysis of a virtual machine includes performing an early exit of the dynamic analysis of the malware sample before the predetermined period of time based on monitoring of the malware sample during execution in the virtual computing environment; and determining that the malware sample is benign.

In some embodiments, a system/process/computer program product for early exit dynamic analysis of a virtual machine includes performing an early exit of the dynamic analysis of the malware sample before the predetermined period of time based on monitoring of the malware sample during execution in the virtual computing environment; and determining that the malware sample is malicious.

In an example implementation, the Hypervisor DA (HvDA) uses full-system Virtual Machine Introspection (VMI) (e.g., implemented using the above-described early exit component) to continuously monitor the guest operating system of the virtual machine and target sample. For example, the HvDA monitors the context and state of each of the following: (1) processes; (2) files written, copied, or moved; (3) registry changes; (4) new or modified system services; (5) scheduled tasks; and (6) files added to auto-start after next reboot.

As such, the disclosed techniques for early exit dynamic analysis of a virtual computing environment can include detecting these and other activities in the virtual computing environment. This information that is collected based on these monitored activities can then be used to determine when an execution of a sample is complete (e.g., full detonation is achieved such that no additional time would plausibly allow for observation of any additional relevant activity) in the virtual machine and can then perform an early exit of the virtual machine, such as will be further described below.

An early exit dynamic analysis can result in a verdict determination for the sample as either benign or malware. In some cases, a deobfuscation analysis engine, such as further described below, automatically generates a malware signature based on a static analysis of the identified executable associated with the unpacked malware binary (e.g., using pattern matching techniques, such as provided by the YARA tool or other commercially available tools/open source solutions).

The automatically generated signatures can be distributed to network security devices (e.g., firewalls), host-based security solutions (e.g., host-based security software/agents), and/or security services to facilitate identification of such malware using these signatures.

Also, malicious payloads can be automatically identified, such as flagging malware families via static and behavior detection rules (e.g., for packed malware samples, these matching rules can be applied directly on the deobfuscated payloads).

In some cases, deobfuscated payloads can be resubmitted for static and dynamic analysis of executables from these changed pages in memory. This may allow for identification of the malware based on dynamic/behavior signatures using the dynamic engine such as further described below.

Further, the disclosed techniques can be used to automatically generate additional indicators for deobfuscated payloads that have not been easily accessible before. This additional data from processing automatically deobfuscated payloads could be accessible to security/malware analysts as well as customers (e.g., via the AutoFocus' contextual threat intelligence service provided by Palo Alto Networks® which can be used to accelerate analysis, correlation, and prevention workflows, which can facilitate security detection/response to, for example, unique, targeted attacks which are automatically prioritized with full context, allowing security teams to respond to critical attacks faster, without additional IT security resources).

The disclosed techniques for early exit dynamic analysis of a virtual machine can reduce the time and computing resources used for performing dynamic analysis of samples, the dynamic analysis using a virtual machine can often be terminated earlier than a default/predetermined period of time. As such, the saved time and compute resources can then be allocated for performing dynamic analysis of other samples (e.g., a greater number of samples can then be scanned per VM instance and per server). This efficiency improvement is significant for computer security entities that typically perform dynamic analysis on thousands to millions of samples per week.

Moreover, the disclosed techniques for providing for an early exit of the dynamic analysis of a sample on a virtual machine also can provide a verdict determination of whether the sample is malware or benign in less time, which is beneficial to users/customers of a computer security service.

Accordingly, various techniques for early exit dynamic analysis of a virtual machine are disclosed. As will be apparent to one skilled in the art in view of the various techniques and embodiments described herein, the various techniques described herein for providing early exit dynamic analysis of a virtual machine can be performed using cloud-based security solutions, network device-based security solutions, host-based/agent-based security solutions, virtualized/software-defined networking (SDN)-based security solutions, and/or various combinations thereof, such as further described below with respect to various embodiments.

System Environment for Early Exit Dynamic Analysis of a Virtual Machine

FIG. 1 illustrates an example of an environment in which malware is detected and its harm reduced in accordance with some embodiments. In the example shown in FIG. 1, a malicious individual (using system 120) has created malware 130. The malicious individual hopes that a client device, such as client device 104, will execute a copy of malware 130, compromising the client device, and causing the client device to then be used for potentially nefarious purposes. For example, the compromised client device can then be instructed to perform tasks (e.g., cryptocurrency mining, participating in denial of service attacks, and/or utilized for lateral movement/advanced persistent threats) and to report information to an external entity, such as command and control (C&C) server 150, as well as to receive instructions from C&C server 150, as applicable.

Returning to the example shown in FIG. 1, suppose client devices 104-108 are a laptop computer, a desktop computer, and a tablet (respectively) present in an enterprise network 110 (belonging to the "Acme Company"). Data appliance 102 is configured to enforce policies regarding communications between clients, such as clients 104 and 106, and nodes outside of enterprise network 110 (e.g., reachable via external network 118, such as the Internet). Examples of such policies include ones governing traffic shaping, quality of service, and routing of traffic. Other examples of policies include security policies such as ones requiring the scanning for threats in incoming (and/or outgoing) email attachments, web site downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can comprise a dedicated device or set of devices. The functionality provided by appliance 102 can also be integrated into or executed as software on a general purpose computer, a computer server, a gateway, and/or a network/routing device. In some embodiments, services provided by data appliance 102 are instead (or in addition) provided to client 104 by software (e.g., host security software or an agent) executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be included in embodiments of system 102 as applicable.

As will be described in more detail below, appliance 102 can be configured to work in cooperation with one or more virtual machine servers (112, 124) to perform malware analysis/prevention. As one example, data appliance 102 can be configured to provide a copy of malware 130 to one or more of the virtual machine servers for real-time analysis, in which the malware is executed in an instrumented virtual environment (e.g., where various user level hooks and/or kernel level hooks in an execution environment emulated in a virtual environment facilitate the monitoring of various program behaviors during execution in the virtual environment, such as performing efficient program deobfuscation through system API instrumentation as described herein). As another example, security service 122 (e.g., a cloud-based security service) can provide a list of signatures of known-malicious files (e.g., pattern-based signatures, behavior signatures, and/or other malware signatures) to appliance 102 as part of a subscription, which can be stored in a data plane of data appliance 102 as shown at 134. Those signatures can be generated by security service 122 in conjunction with the techniques for efficient program deobfuscation through system API instrumentation as described herein. As yet another example, and as will be described in more detail below, results of analysis performed by the virtual machine servers (e.g., VM server 112 executing VM instances 114 and 116 and/or VM server 124 executing VM instances 126 and 128) can be used to generate those signatures in conjunction with the techniques for efficient program deobfuscation through system API instrumentation as described herein.

An example of a virtual machine server is a physical machine comprising commercially available server-class hardware (e.g., a multi-core processor, 64+ Gigabytes of RAM, and one or more Gigabit network interface adapters) that runs commercially available virtualization software, such as VMware ESXi, Citrix XenServer, Kernel Based Virtual Machine (KVM), or Microsoft Hyper-V. The virtual machine server can be configured to run a commercially available hypervisor (without customizations) or a customized hypervisor (whether as a modified version of a commercially-available hypervisor, or a custom-built hypervisor).

Returning to the example of FIG. 1, the virtual machine servers can be separate from, but in communication with, data appliance 102, as shown. A virtual machine server can also perform some or all of the functions of data appliance 102 (or the subset of functions described herein as pertaining to the performing of efficient program deobfuscation through system API instrumentation), and a separate data appliance 102 omitted as applicable. Further, a virtual machine server can be under the control of the same entity that administers data appliance 102 (e.g., virtual machine server 112); the virtual machine server can also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not pictured). Further, in various embodiments, multiple virtual machine servers are present within the same platform. For example, security service 122 (e.g., a commercially available security service, such as the WildFire™ cloud-based malware analysis environment provided by Palo Alto Networks®) can make use of multiple virtual machine servers (in addition to virtual machine server 124). In yet additional embodiments, at least some virtual machine servers are provided by an entity that is different from the operator of security service 122. For example, security service 122 could be operated by a computer security company which makes use of third party cloud computing services, such as Amazon Web Services (AWS), to provide at least some of the computer security company's virtual machine servers. Finally, while examples are described herein as making use of virtual machine servers (e.g., to allow for a single host system executing multiple guest systems at once), the techniques described herein, and in particular, the activities described as being performed inside a guest system, can also be performed using non-virtualized hardware (e.g., to thwart anti-virtual-machine techniques employed by malware).

Figure 2:
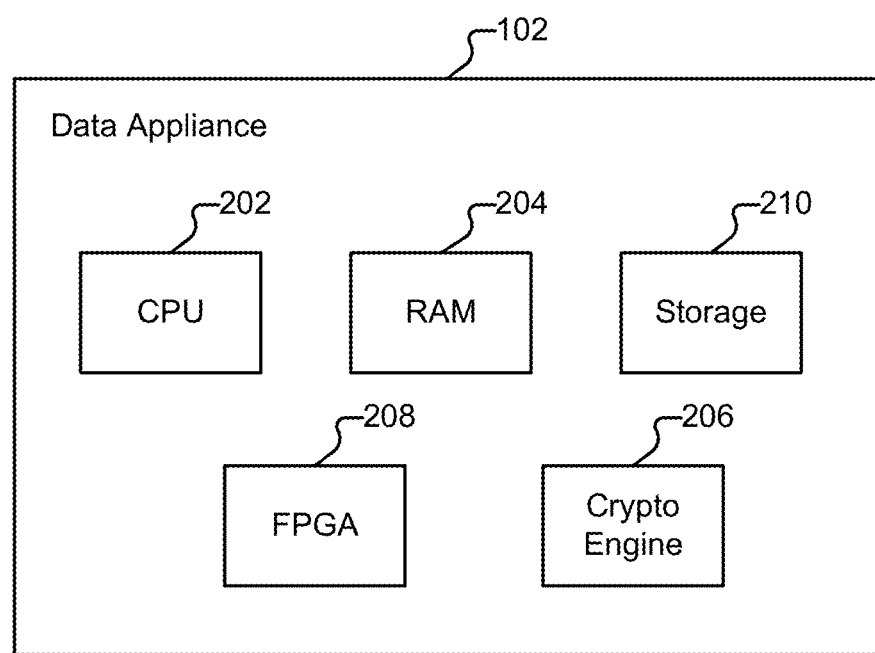
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as signatures (e.g., pattern-based signatures, behavior signatures, and/or other malware signatures, which can be generated using the techniques for efficient program deobfuscation through system API instrumentation as described herein). Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Using Virtual Machines to Analyze Files

A virtual machine (VM) can be used to perform behavior profiling (e.g., in a VM sandbox environment) using various heuristic-based analysis techniques that can be performed in real-time during a file transfer (e.g., during an active file/attachment download) and/or on files previously collected (e.g., a collection of files submitted for batch analysis). Documents, executables, and other forms of potentially malicious software (e.g., to be evaluated) are referred to herein as "malware samples" or simply as "samples."

Returning to the example of FIG. 1, suppose a malicious user of system 120 sends an email message to a user of client 104 that includes a malicious attachment. The attachment may be an executable (e.g., having a .exe extension) and may also be a document (e.g., a .doc or .pdf file). The message is received by data appliance 102, which determines whether a signature for the attachment is present on data appliance 102. A signature, if present, can indicate that the attachment is known to be safe, and can also indicate that the attachment is known to be malicious, in accordance with various embodiments. If no signature for the attachment is found, data appliance 102 is configured to provide the attachment to a virtual machine server, such as virtual machine server 112 or 124, for analysis.

Virtual machine server 112 is configured to perform static analysis of samples, and also to perform dynamic analysis of samples, in which the samples are executed (or opened in an application, as applicable) in one or more virtual machine instances 114-116. The virtual machine instances may all execute the same operating system (e.g., Microsoft Windows® XP SP 3, Microsoft Windows® 7, and Microsoft Windows® 10), may execute different operating systems (e.g., Apple Mac® OS or iOS platforms, Google Android® OS platforms, or Linux OS platforms), and/or may collectively execute combinations of operating systems (and/or versions thereof) (e.g., with VM instance 116 emulating an Android operating system). In some embodiments, the VM image(s) chosen to analyze the attachment are selected to match the operating system of the intended recipient of the attachment being analyzed (e.g., where the operating system of client 104 is Microsoft Windows XP SP 2). Observed behaviors resulting from executing/opening the attachment (such as changes to certain platform, software, registry settings, any network connection attempts made, or memory in which changes to memory can be monitored for implementing efficient program deobfuscation through system API instrumentation) are logged and analyzed for indications that the attachment is malicious.

In some embodiments, the dynamic analysis is performed in several stages as similarly described above and further described below. Specifically, the dynamic analysis can be performed in several stages to monitor changes to memory for implementing efficient program deobfuscation through system API instrumentation as described above and further described below. In addition, the dynamic analysis can be performed to monitor activities during dynamic analysis to determine whether to perform an early exit dynamic analysis of the virtual machine as will also be further described below.

In some embodiments log analysis (e.g., of results of static/dynamic analysis) is performed by the VM server (e.g., VM server 112). In other embodiments, the analysis is performed at least in part by appliance 102. The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable. For example, the functionality described herein (or portions thereof) as being provided by malware analysis system 132 can also be provided by security service 122 using VM server 124.

If the attachment is determined to be malicious, appliance 102 can automatically block the file download based on the analysis result. Further, a signature can be generated and distributed (e.g., to other data appliances, host security software/agents, and/or to cloud security service 122) to automatically block future file transfer requests to download the file determined to be malicious.

Figure 3:
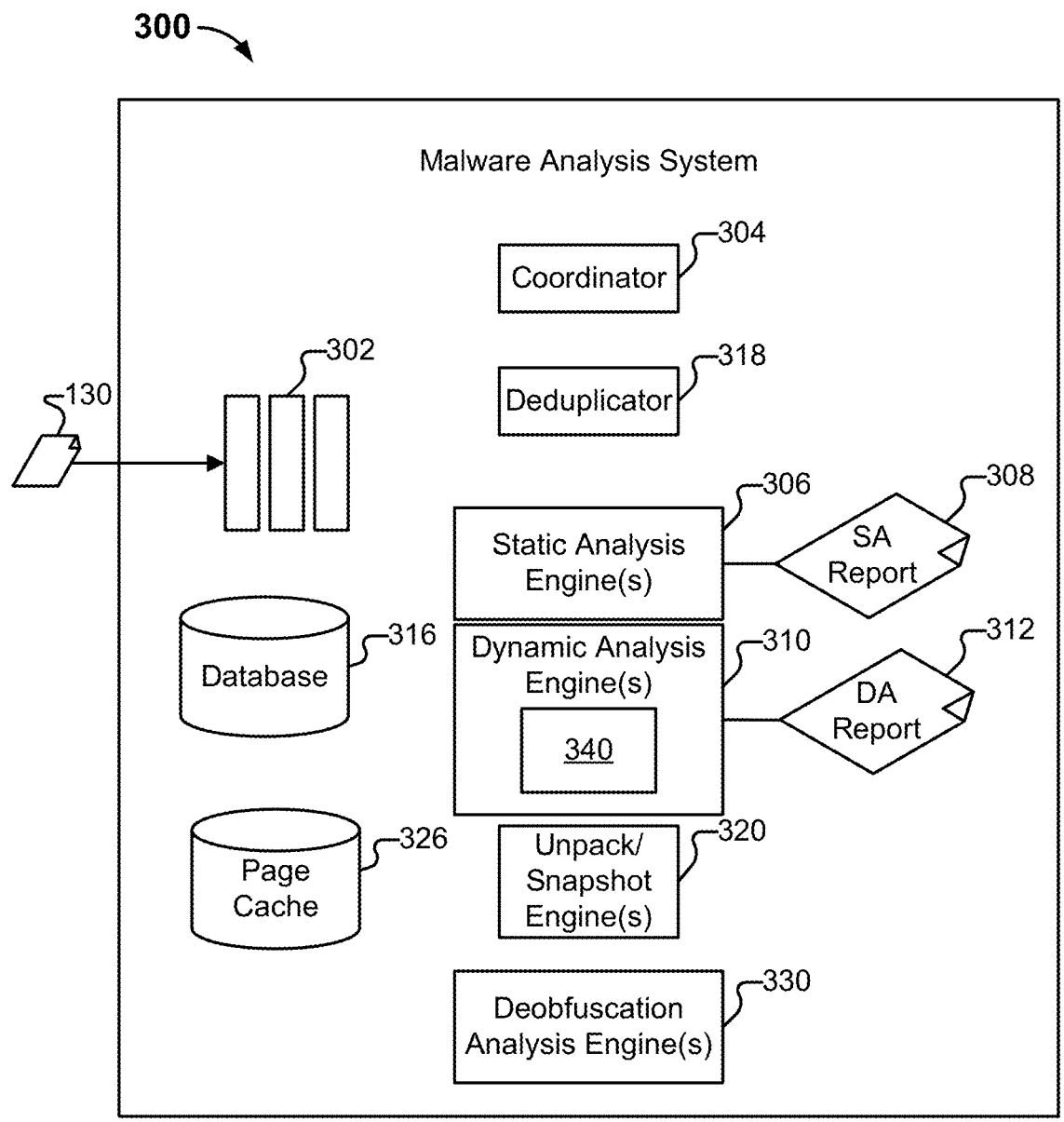
FIG. 3 illustrates an example of logical components that can be included in a malware analysis system for performing early exit dynamic analysis of a virtual machine in accordance with some embodiments.

Logical Components for Performing Early Exit Dynamic Analysis of a Virtual Machine FIG. 3 illustrates an example of logical components that can be included in a malware analysis system for performing early exit dynamic analysis of a virtual machine in accordance with some embodiments. System 300 can be implemented using a single physical device. System 300 can also be implemented, collectively, across multiple distinct devices. For example, when data appliance 102 works in combination with virtual machine server 112, malware analysis system 132 is an embodiment of system 300. As another example, the functionality of system 300 can be provided by security service 122. As explained above, cloud security service 122 can include a single (124), or multiple virtual machine servers.

As mentioned above, a given piece of candidate malware (e.g., a potentially malicious document/file/etc.) can be received for analysis in a variety of ways. In the following discussion, malware 130 (intended for a client such as client 104 by a malware author) is received by data appliance/platform 102 and a check is made (e.g., against information stored in storage 210) to determine whether malware 130 matches any signatures of known malware. Suppose in the following example that no such signature is present on platform 102, and also that no such signature is present on cloud security service 122 (where platform 102 is configured to check for the existence of a signature on security service 122). Platform 102 sends a copy of malware 130 to security service 122 for further analysis (e.g., before allowing it to be delivered to client device 104). In various embodiments, when a new piece of candidate malware is received for analysis (e.g., an existing signature associated with the file is not present at security service 122), it is added to a processing queue 302.

Coordinator 304 monitors queue 302, and as resources (e.g., a static analysis worker) become available, coordinator 304 fetches a piece of potential malware for analysis from queue 302 for processing (e.g., fetches a copy of malware 130). In particular, after coordinator 304 initially determines whether the sample has previously been analyzed by checking with a deduplicator component shown at 318, and if not, then coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306). In yet other embodiments, static analysis is omitted, or provided by a third party, as applicable.

The static analysis engine obtains general information about the candidate malware and includes it (along with heuristic and other information, as applicable) in a static analysis (SA) report 308. The report can be created by the static analysis engine, or by coordinator 304 (or by another appropriate component) which can be configured to receive the information from static analysis engine 306. In some embodiments, the collected information is stored in one or more database records for the candidate malware (e.g., in a database 316), instead of or in addition to a separate static analysis report 308 being created (i.e., portions of the database record form the static analysis report 308).

Once the static analysis is complete, coordinator 304 locates an available dynamic analysis engine 310 to perform dynamic analysis on the candidate malware. As with static analysis engine 306, system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis engine manages a virtual machine (VM) instance. As also shown, each dynamic analysis engine includes an early exit component 340. In an example implementation, an early exit component for a virtual computing environment (e.g., VM instance) is provided to facilitate monitoring of the sample during a dynamic analysis to determine if and when to perform an early exit of the dynamic analysis on the virtual computing environment. In this example, the virtual computing environment is implemented as a virtual machine (e.g., VM instance) using a hypervisor dynamic analysis (DA) sandbox. The early exit component can be implemented as a plugin to the hypervisor DA sandbox. The plugin can be written in a high-level programming language, such as Python or another programming language. The early exit component can be executed outside of the guest OS of the VM instance to monitor the activities of the sample during execution using the hypervisor DA sandbox.

For example, the early exit component (340) can detect if a sample does not run or if it has been terminated. The early exit component can also detect if the sample has created any new Windows scheduled-tasks, if all monitored processes are terminated, and if the sample has created a new executable file which we have to wait for before we can exit the analysis earlier. The early exit component can monitor various other activities during the dynamic analysis as further described below. Based on these monitored activities, the early exit component can determine if and when to terminate the dynamic analysis (e.g., whether or not to perform an early exit of the dynamic analysis of the sample in the virtual computing environment, that is, whether we should wait for the full analysis time/predetermined period of time, or if we should exit the dynamic analysis prior to expiration of the predetermined period of time). In this example implementation, each time a process termination is detected using the early exit component, whether or not to perform an early exit can be determined as will also be further described below.

Below are a few examples of the activities that are monitored using the early exit component to facilitate determining whether to perform an early exit of the dynamic analysis of a sample in the virtual computing environment.

Scheduled Tasks

The early exit component can detect scheduled tasks during dynamic analysis of the sample in the virtualized computing environment. For example, if a sample creates a dynamically linked Library (DLL) inside a Microsoft Windows OS directory and afterwards creates a scheduled-task to load that DLL (e.g., in the next two minutes or some other scheduled delay), then the early exit component can determine to wait for the scheduled task to be started and to load the DLL. In this example, after that scheduled task has been created and the DLL has been loaded, the early exit component can determine at that time to perform an early exit of the dynamic analysis using the virtual machine.

Import of Unknown Libraries

The early exit component can detect imports of (unknown) libraries during dynamic analysis of the sample in the virtualized computing environment. For example, if a sample attempts to call additional library(ies) (e.g., requires import of unknown libraries), then the sample will fail to execute in the virtual machine, because the Windows PE loader cannot load the requested additional library(ies). As a result, in this example, the early exit component can determine at that time to perform an early exit of the dynamic analysis using the virtual machine.

Injection of the Executable into Another Process

The early exit component can detect process injections during dynamic analysis of the sample in the virtualized computing environment. For example, if one or more process injections are detected, then the early exit component continues to monitor until the last injected process terminates.

File Activities

The early exit component can detect file activities during dynamic analysis of the sample in the virtualized computing environment. For example, if the early exit component detects any files were stored/copied/modified, then the early exit component will continue to monitor (e.g., to detect if any of those files is executed inside the guest VM) before exiting the analysis early.

Launching of a Child Process(es)

The early exit component can detect a launch of a child process(es). For example, if one or more child process launches are detected, then the early exit component continues to monitor until the last child process terminates.

Additional Monitored Activities

In this example implementation, the Hypervisor DA (HvDA) uses full-system Virtual Machine Introspection (VMI) (e.g., implemented using the above-described early exit component) to continuously monitor the guest operating system of the virtual machine and target sample. For example, the HvDA monitors the context and state of each of the following: (1) processes; (2) files written, copied, or moved; (3) registry changes; (4) new or modified system services; (5) scheduled tasks; and (6) files added to auto-start after next reboot.

Specifically, in this example implementation, when a sample is being analyzed, the filename is generated before performing the dynamic analysis, and then the process associated with the filename (e.g., the process that has this filename) is monitored. In this instrumented VM environment (e.g., sandbox), various hooks are installed in the operating system to monitor various activities, such as process creation/termination, file activities, etc. For example, for monitoring for creation of and termination of processes, we are hooking inside the Windows kernel at the function nt!ViCreateProcessCallback to monitor and collect (e.g., log) information on such process creation/termination events. As such, this information can be monitored and collected to facilitate determining when sample has been executed or terminated, as well as whether the process has launched any child processes by checking its parent process ID, such as similarly described herein. For monitoring the created or copied files, we hook inside the monitored process and at the regular Windows file APIs, such as NtCreateFile, MoveFile, and CopyFile. At such hook callbacks, we verify that the calls were successful and then save the created file names (e.g., saving files that may be executable, such as files on a Microsoft Windows OS environment that have an executable extension, such as one of the following example extensions: exe, dll, sys, etc.). The early exit component can then check if all processes (e.g., child processes, dropped files, etc.) have been terminated that were also monitored by this instrumented VM environment and determine whether there is anything else to wait on for monitoring (e.g., a dropped executable file has not yet been executed).

As such, the disclosed techniques for early exit dynamic analysis of a virtual computing environment can include detecting these and other activities in the virtual computing environment. This information that is collected based on these monitored activities can then be used to determine when an execution of a sample is complete (e.g., full detonation is achieved such that no additional time would plausibly allow for observation of any additional relevant activity) in the virtual machine and can then perform an early exit of the virtual machine, such as will be further described herein.

In some embodiments, results of static analysis (e.g., performed by static analysis engine 306), whether in report form (308) and/or as stored, such as in database 316, are provided as input to a dynamic analysis engine 310. For example, the static analysis report information can be used to help select/customize the virtual machine instance used by dynamic analysis engine 310 (e.g., Microsoft Windows XP Service Pack 3 vs. Windows 7 Service Pack 2). Where multiple virtual machine instances are executed at the same time, a single dynamic analysis engine can manage all of the instances, or multiple dynamic analysis engines can be used (e.g., with each managing its own virtual machine instance), as applicable. In some embodiments, the collected information is stored in one or more database records for the candidate malware (e.g., in database 316), instead of or in addition to a separate dynamic analysis (DA) report 312 being created (i.e., portions of the database record form the dynamic analysis report 312).

As also shown in FIG. 3, malware analysis system 300 includes an unpack/snapshot engine(s) 320, a page cache 326, and a deobfuscation analysis engine(s) 330 that perform various functions for implementing efficient program deobfuscation through system API instrumentation in accordance with some embodiments. For example, during a dynamic analysis phase, dynamic malware analysis engine(s) 310 can utilize unpack/snapshot engine 320 to automatically unpack and selectively snapshot process pages in memory during emulation of the malware sample as similarly described herein. The snapshotted memory pages can be stored in page cache 326. The output of the dynamic analysis including the efficient program deobfuscation through system API instrumentation can be provided as input to deobfuscation analysis engine(s) 330 for reassembling the cached memory pages, analyzing of the reassembled cached memory pages, and generating a signature based on a static analysis of the reassembled cached memory pages (e.g., in an example implementation, the static analysis can be performed using static analysis engine(s) 306). The generated signature can be added to database 316.

In various embodiments, the initial static analysis of candidate malware is omitted or is performed by a separate entity, as applicable. As one example, traditional static and/or dynamic analysis may be performed on files by a first entity. Once it is determined (e.g., by the first entity) that a given file is malicious, and more particularly, that the file is (or is potentially) making use of obfuscation or packing to attempt to conceal malware binaries, then the file can be provided to a second entity (e.g., the operator of security service 122) specifically for additional analysis with respect to the obfuscation or packing to attempt to conceal malware binaries (e.g., by a dynamic analysis engine 310 in coordination with unpack/snapshot engine 320, page cache 326, and deobfuscation analysis engine 330).

FIGS. 4A-D illustrate the inefficient use of computing resources for dynamic analysis performed for a predetermined period of time.

Figure 4A:
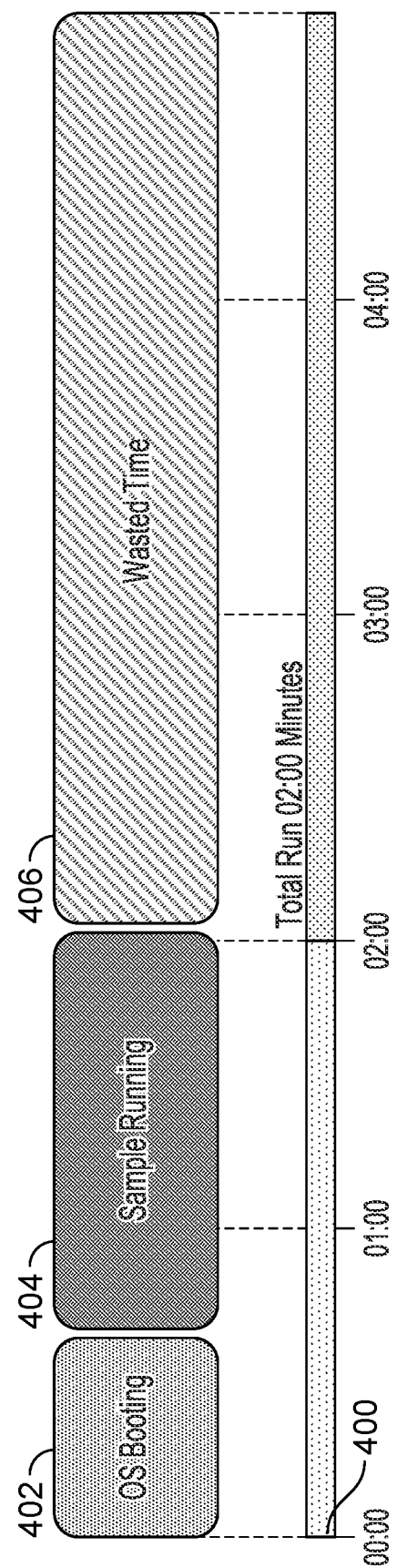

Referring to FIG. 4A, OS booting of the VM instance is shown at 402, then a sample running in the VM instance is shown at 404. As shown at time bar 400, only two minutes of time was required for a dynamic analysis of this first sample in the VM instance. As a result, the wasted time of this VM instance and other computing resources (e.g., CPU and memory of a server executing the VM instance) is shown at 406, which is the remainder of a five minute predetermined period of time allocated for such dynamic analysis (i.e., about three minutes was wasted during this example dynamic analysis).

Figure 4B:
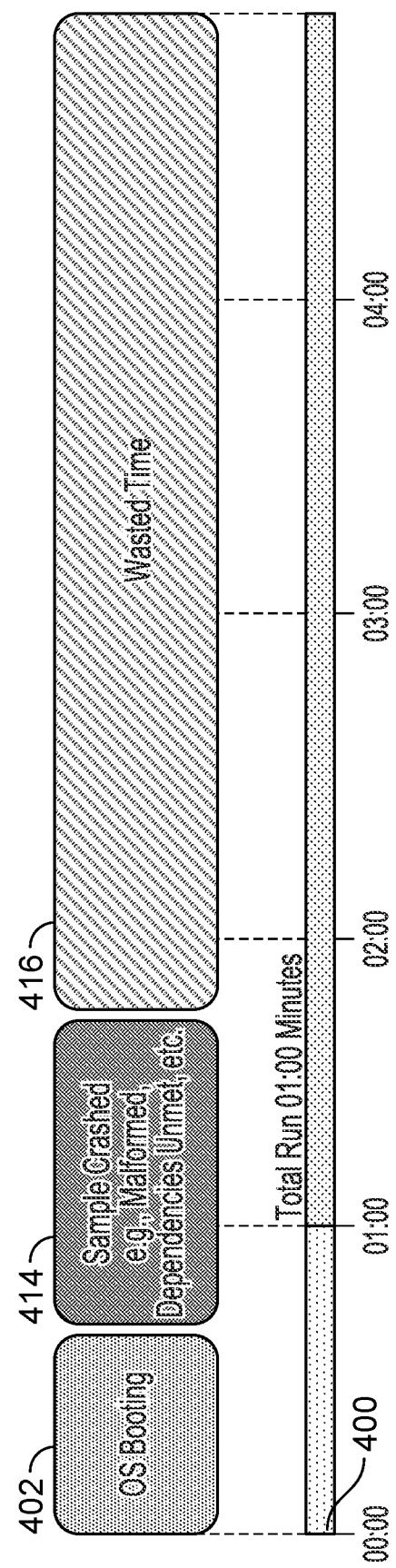

FIG. 4B shows a dynamic analysis of another sample that crashes (e.g., cannot run or exits immediately) as shown at 414 (e.g., malformed dependencies unmet, etc.), and as such, only one minute of time was required for a dynamic analysis of this second sample in the VM instance. As a result, the wasted time of this VM instance and other computing resources (e.g., CPU and memory of a server executing the VM instance) is shown at 416, which is the remainder of a five minute predetermined period of time allocated for such dynamic analysis (i.e., about four minutes was wasted during this example dynamic analysis).

Figure 4C:
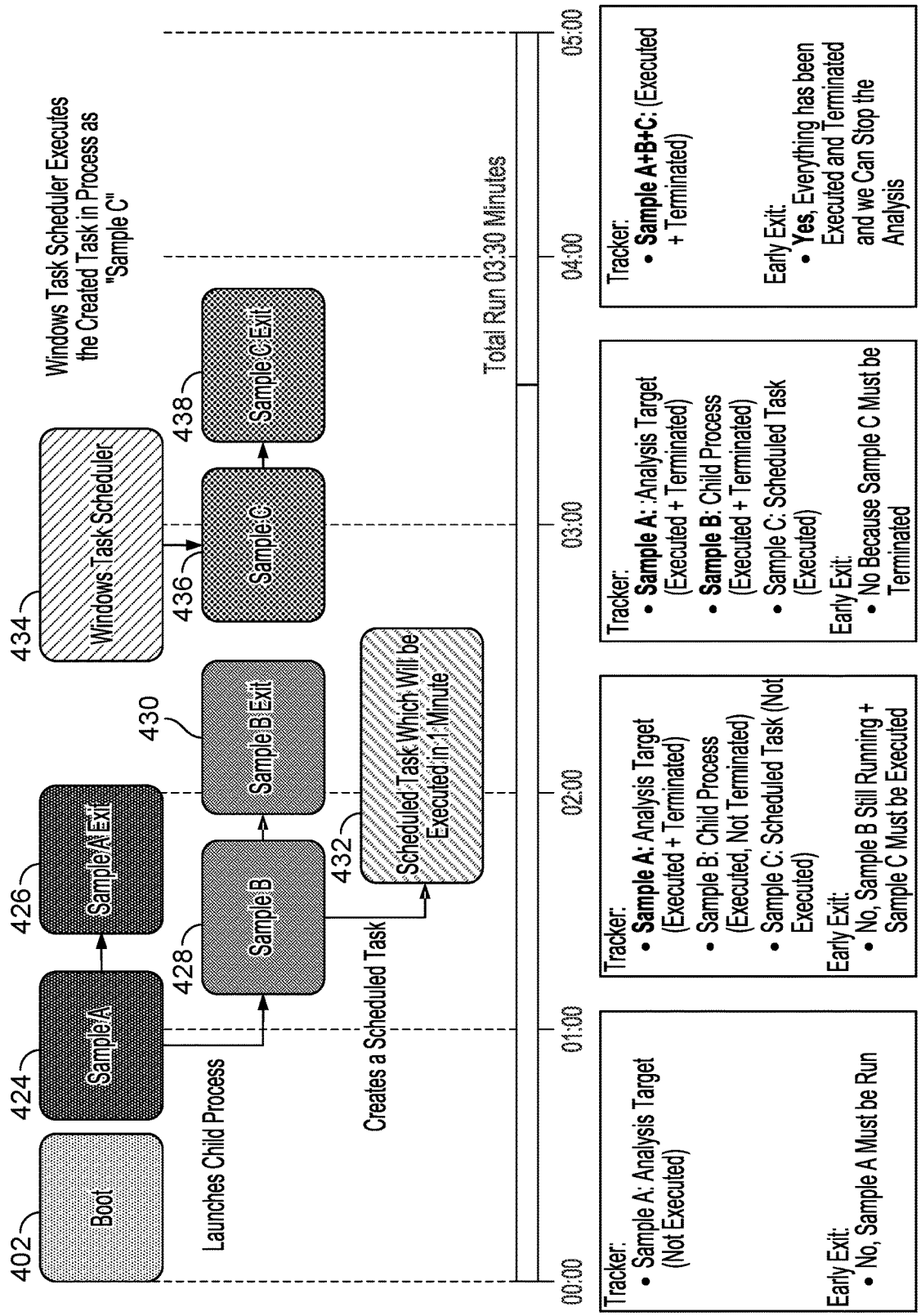

Referring to FIG. 4C, OS booting of the VM instance is shown at 402, then a sample A is executed in the VM instance as shown at 424 and then terminates as shown at 426. However, the early exit component (e.g., such as described above with respect to FIG. 3) detects that sample A launches a child process shown as sample B 428, which terminates as shown at 430. Prior to sample B exiting, the early exit component detects a scheduled task to be executed in one minute as shown at 432. As such, the early exit component continues to monitor activities for at least another one minute. After one minute, Windows task scheduler 434 executes the created task in a new process shown as sample C 436. Sample C exits as shown at 438. As shown at time bar 400, only three minutes and thirty seconds of time was required for a dynamic analysis of this third sample (sample A) in the VM instance. As a result, the wasted time of this VM instance and other computing resources (e.g., CPU and memory of a server executing the VM instance) is the remainder of a five minute predetermined period of time allocated for such dynamic analysis (i.e., about one minute and thirty seconds was wasted during this example dynamic analysis).

Referring to FIG. 4D, a visualization of the time used for each of three controllers for performing dynamic analysis of samples is shown. The dynamic analysis engine does not monitor program state to determine whether to perform an early exit of the dynamic analysis. As a result, the dynamic analysis of the samples is performed for a predetermined period of time (e.g., for five minutes) as shown at 440. Moreover, the disk is mounted twice, before executing a copy of the sample and after the execution to retrieve the dynamic analysis log data, as shown at 442. In contrast, the dynamic analysis performed using the disclosed techniques for early exit dynamic analysis of a virtual machine utilized computing resources much more efficiently as will now be described with respect to FIG. 4E.

Figure 4E:
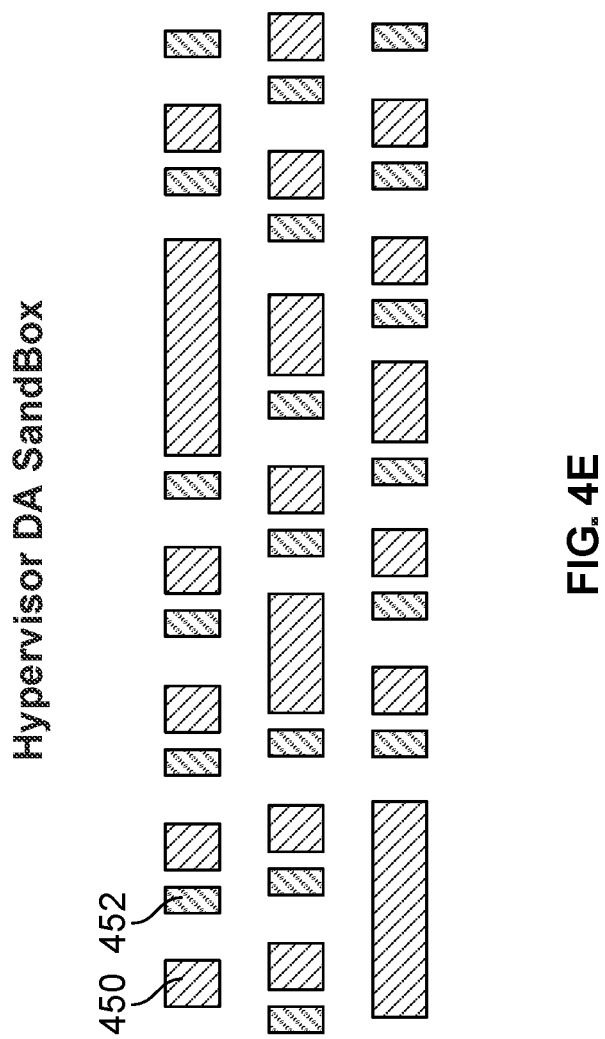
FIG. 4E illustrates a more efficient use of computing resources by performing early exit dynamic analysis of a virtual machine in accordance with some embodiments.

FIG. 4E illustrates a more efficient use of computing resources by performing early exit dynamic analysis of a virtual machine in accordance with some embodiments. For example, system 300 (e.g., using dynamic analysis engine 310 and early exit component 340) can be used to perform early exit dynamic analysis of a virtual machine as similarly described above.

Referring to FIG. 4E, the dynamic analysis engine (e.g., using early exit component 340) monitors process state (e.g., and other activities as similarly described above) to determine whether to perform an early exit of the dynamic analysis. As a result, the dynamic analysis of the samples is often performed for less than the predetermined period of time (e.g., for five minutes) as shown, for example, at 450. Moreover, the disk is mounted once, before executing the sample, to copy the sample into the hypervisor DA sandbox, as shown at 452. Mounting the disk generally requires a certain amount of time, and existing sandboxes typically perform this mounting the disk operation twice as they (1) copy the sample to the disk, and (2) after the dynamic analysis, they typically must mount the disk again to retrieve the logged events (e.g., logs). In contrast, using the disclosed techniques for sandboxes for dynamic analysis of malware samples, we only mount the disk once to copy the sample, because we log events (e.g., generate the logs) outside of the guest OS of the VM instance (e.g., using the disclosed dynamic-analysis, we log the events are logged at every vmexit and as such do not have to mount the disk twice unlike existing approaches for sandboxes for dynamic analysis of malware samples).

As will be apparent, while the above-described embodiments are described with respect to monitored samples executing in Microsoft Windows® OS platform environments, the disclosed techniques for early exit dynamic analysis of a virtual machine can be similarly applied to various other OS platform environments, such as Apple Mac® OS, Linux, Google Android® OS, and/or other platforms, as would now be apparent to one of ordinary skill in the art in view of the disclosed embodiments.

Processes for Early Exit Dynamic Analysis of a Virtual Machine

Figure 5:
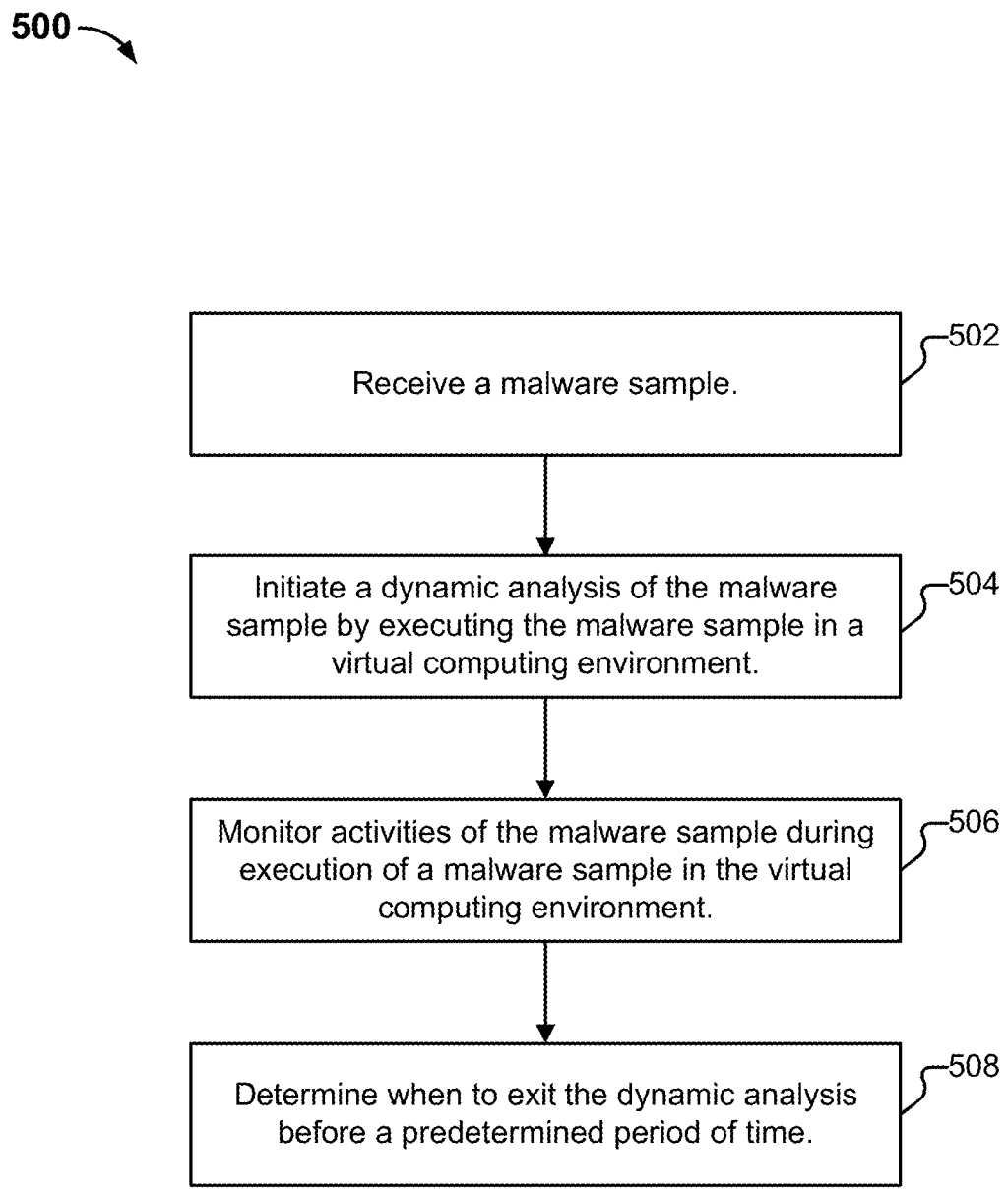
FIG. 5 illustrates an embodiment of a process for early exit dynamic analysis of a virtual machine.

FIG. 5 illustrates an embodiment of a process for early exit dynamic analysis of a virtual machine. In various embodiments, process 500 is performed by system 300 (examples of which include malware analysis system 132 and cloud security service 122 as shown in FIG. 1). The process begins at 502 when a malware sample (e.g., candidate malware) is received. As one example, candidate malware is received at 502 when an email (including an attachment) is received by data appliance 102 from system 120. As another example, data appliance 102 can be configured to transmit the attachment to service 122 for analysis. In that scenario, the candidate malware is received by service 122 at 502. As yet another example, candidate malware can be received at 502 as part of a batch operation (e.g., where cloud security service 122 receives a variety of malware samples over a period of time and a batch of received samples is provided to virtual machine server 124 for processing—with virtual machine server 124 receiving the batch at 502). Further, the batch operation can be repeated (e.g., on the same set of samples—or on a set that includes at least some of the same samples as previous batches).

At 504, a dynamic analysis of a malware sample is initiated by executing the malware sample in a virtual computing environment. For example, the computing environment can be implemented initializing a virtual machine instance (e.g., an instrumented virtual environment, such as similarly described above with respect to 112 and 124 of FIG. 1 and further described above with respect to 310 and 340 of FIG. 3). The virtual environment is instrumented, as applicable, such that behaviors observed while the application is executing are logged and/or monitored (e.g., including monitoring various process, file, system, and other activities for determining whether to perform an early exit dynamic analysis of the virtual machine instance) as similarly described above.

At 506, monitoring activities of the malware sample during execution of the malware sample in the virtual computing environment is performed. For example, various process, file, system, and other activities for determining whether to perform an early exit dynamic analysis of the virtual machine instance can be monitored during execution of the malware sample in the computing environment as similarly described above.

At 508, when to exit the dynamic analysis before a predetermined period of time is determined. For example, if the only process associated with the sample terminates and no other relevant activities were detected (e.g., scheduling of new tasks, etc.), then the early exit component determines that the sample is fully detonated, and the dynamic analysis can be exited prior to the predetermined period of time allocated for dynamic analysis.

Remedial Actions

As explained above, various remedial actions can be performed using the disclosed techniques for malware detection using dynamic analysis. For example, signatures can be automatically generated based on the malware binaries identified in the automatically unpacked code/binaries during malware execution in the malware analysis environment (e.g., performing a static analysis of the unpacked code/binaries to generate pattern-based signatures, such as signatures based on YARA rules). The signatures can be distributed to security devices (e.g., security/firewall appliances), host security software/agents, and/or a security service for enforcement based on the signature (e.g., applied to deobfuscated/unpacked payloads).

As another example, the extracted payload from the deobfuscated/unpacked code/binaries can be submitted for dynamic analysis (e.g., using the dynamic engine (310)) to generate new signatures such as dynamic/behavior signatures (e.g., as well as applying existing signatures, such as signatures based on YARA rules).

As yet another example, the disclosed techniques can be applied to cluster malware families that may utilize different obfuscation or packing approaches to conceal identical or similar malware code/binaries. The automatically unpacked code/binaries detected during malware execution can be compared across malware samples to facilitate clustering of such malware families (e.g., identifying malware families using YARA rules or similar techniques).

Figure 6:
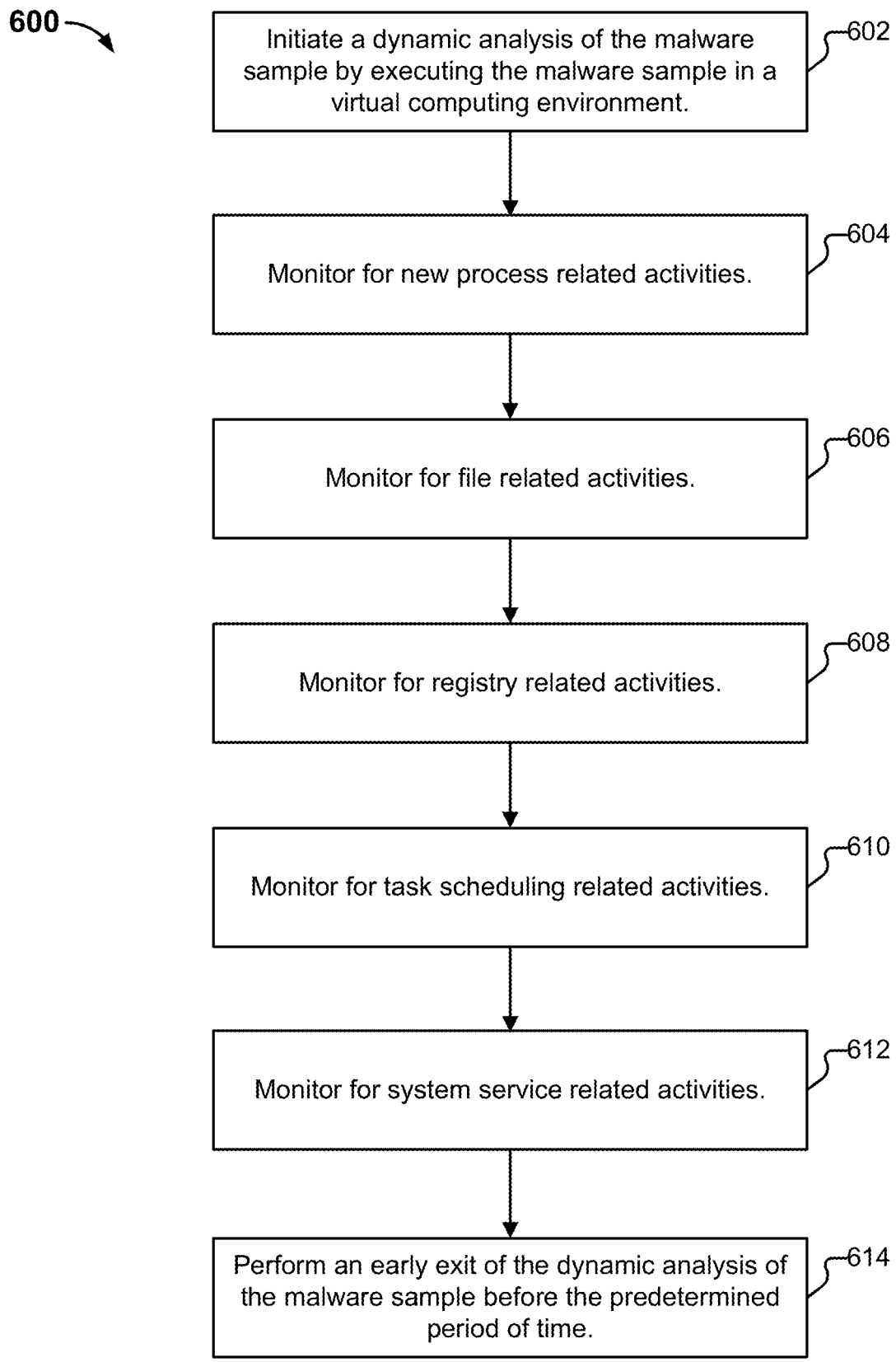
FIG. 6 illustrates another embodiment of a process for early exit dynamic analysis of a virtual machine.

FIG. 6 illustrates another embodiment of a process for early exit dynamic analysis of a virtual machine. In various embodiments, process 600 is performed by system 300. The process begins at 602 when a dynamic analysis of a malware sample is initiated by executing the malware sample in a virtual computing environment.

At 604, monitoring for new process related activities (e.g., launching a new process) during execution of the malware sample in the virtual computing environment is performed.

At 606, monitoring for file related activities (e.g., writing, copying, or moving a file) during execution of the malware sample in the virtual computing environment is performed.

At 608, monitoring for registry related activities (e.g., changing a registry setting) during execution of the malware sample in the virtual computing environment is performed.

At 610, monitoring for task scheduling related activities (e.g., scheduling a task) during execution of the malware sample in the virtual computing environment is performed.

At 612, monitoring for system service related activities (e.g., modifying a system service) during execution of the malware sample in the virtual computing environment is performed.

At 614, an early exit of the dynamic analysis of the malware sample is performed before the predetermined period of time. For example, the early exit is determined based on monitoring of the malware sample during execution in the virtual computing environment to determine that the malware sample has completed execution and no further dynamic analysis is to be performed to determine whether the malware sample is malicious or benign. In some cases, the malware analysis system (300) can use the results of the dynamic analysis (e.g., DA report 312) to determine that the malware sample is benign.

Example Use Cases for Early Exit Dynamic Analysis of a Virtual Machine

FIG. 7A illustrates a log of the monitored activities during dynamic analysis of a sample in accordance with some embodiments. In this example, the sample is a Hello World executable (e.g., WF_HelloWorld.exe) that simply shows a message box and then exits. The total analysis time is 45 seconds instead of the default predetermined period of time for dynamic analysis of five minutes.

FIG. 7B illustrates a log of the monitored activities during dynamic analysis of another sample in accordance with some embodiments. In this example, the sample (e.g., TestWildFirePEInjection.exe) injects itself into another process, and both processes then exit afterwards. The total analysis time is 54 seconds instead of the default predetermined period of time for dynamic analysis of five minutes.

FIGS. 7C-D illustrate a log of the monitored activities during dynamic analysis of a sample in accordance with some embodiments. In this example, the sample schedules a task that runs after the sample has been terminated. Referring to FIG. 7C, this sample creates a scheduled task that will be executed in one minute after the sample has been executed. As such, the early exit component does not terminate the analysis upon termination of the sample but rather waits until the scheduled task has been executed (e.g., in this case, test_wf.vbs, which will be loaded by wscript.exe in the Microsoft Windows OS).

Referring to FIG. 7D, another view of the log is shown in which some lines are removed for readability and the sample name has been replaced to show as sample.exe. It should also be noted that the time stamps are actual times from the host operating system and are different than the ones inside the sandbox. This output can be interpreted as will now be described. The sample gets executed at 06:36:33 host time (PID: 1836). Inside the guest the time is 7:37:36. The sample drops a file named "c:\test_wf.vbs" and creates a scheduled task with schtasks.exe (PID: 1080). The name of the scheduled task is "WildFireTest" and the file that must be executed is "c:\test_wf.vbs" in 1 minute (guest time). The sample (PID: 1836) exits. As mentioned above, early exit cannot yet be performed, because the sample has created a task, and as a result, the early exit component is configured to wait until every process and task has been executed. The process that created the scheduled task (PID: 1080) exits. Again, early exit is not yet performed. One minute passes by inside the guest OS (e.g., which is performed faster than one minutes as the dynamic analysis engine (310) is configured to perform wait state elimination). Many existing sandboxes will terminate at this point, and thus, miss potential dynamic analysis that can be performed by monitoring activities that are performed after triggering the scheduled task. After this wait state (e.g., after one minute passes), the Microsoft Windows OS will run the task through the taskeng.exe (PID: 1728) process and launch wscript.exe (PID: 1696), which launches the sample. As then shown in this log, wscript.exe (PID: 1696) terminates, and at this point in time, the early exit component detects that wscript.exe (PID: 1696) terminates and determines to perform the early exit (e.g., because everything has been executed and there is no child process, no created service, and no dropped files created from the wscript.exe process). As such, at 6:37:15 host time, the dynamic analysis is stopped after 1:07 minutes total analysis time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
  initiate a dynamic analysis of a malware sample by executing the malware sample in a virtual computing environment for a predetermined period of time;
  monitor activities of the malware sample including launching a new process during the execution of the malware sample in the virtual computing environment; and
  perform an early exit of the dynamic analysis of the malware sample before the predetermined period of time based on the monitoring of the activities of the malware sample during the execution of the malware sample in the virtual computing environment to determine that using all of the predetermined period of time for the dynamic analysis is not required to determine that the malware sample is malicious or benign based on one or more of the following:
    (1) the malware sample cannot be executed in the virtual computing environment;
    (2) the malware sample requires an external dependency that is not available in the virtual computing environment;
    (3) the malware sample is associated with an unsupported file sub-type; and/or
    (4) analysis of the new process of the malware sample has been completed;
a memory coupled to the processor and configured to provide the processor with instructions.

2. The system recited in claim 1, wherein the virtual computing environment comprises a virtual machine instance.

3. The system recited in claim 1, wherein an early exit from the dynamic analysis before the predetermined period of time is performed based on a termination of a main process associated with executing the malware sample in the virtual computing environment.

4. The system recited in claim 1, wherein an output of the monitored activities of the malware sample during execution of the malware sample in the virtual computing environment is automatically analyzed to determine whether the malware sample is malicious or benign.

5. The system recited in claim 1, wherein monitoring activities of the malware sample during execution of the malware sample in the virtual computing environment includes one or more of the following: writing, copying, or moving a file; changing a registry setting; modifying a system service; and scheduling a task.

6. The system recited in claim 1, wherein the processor is further configured to:
monitor memory during execution of the malware sample in the virtual computing environment.

7. The system recited in claim 1, wherein the processor is further configured to:
monitor for writing, copying, or moving a file during execution of the malware sample in the virtual computing environment.

8. The system recited in claim 1, wherein the processor is further configured to:
monitor for changing a registry setting during execution of the malware sample in the virtual computing environment.

9. The system recited in claim 1, wherein the processor is further configured to:
monitor for modifying a system service during execution of the malware sample in the virtual computing environment.

10. The system recited in claim 1, wherein the processor is further configured to:
monitor for scheduling a task during execution of the malware sample in the virtual computing environment.

11. The system recited in claim 1, wherein the processor is further configured to:
perform an early exit of the dynamic analysis of the malware sample before the predetermined period of time based on monitoring of the malware sample during execution in the virtual computing environment and determining that full detonation has been achieved wherein additional time for dynamic analysis would not allow for observation of any additional relevant activity for determining whether the malware sample is malicious or benign.

12. The system recited in claim 1, wherein the processor is further configured to:
determine when to exit the dynamic analysis before the predetermined period of time, wherein an early exit from the dynamic analysis before the predetermined period of time is performed based on a determination of a main process associated with executing the malware sample in the virtual computing environment that the malware sample has completed execution and no further dynamic analysis is to be performed to determine whether the malware sample is malicious or benign, wherein no other relevant activities associated with the monitored activities of the malware sample during execution of the malware sample in the virtual computing environment were detected.

13. The system recited in claim 1, wherein the processor is further configured to:
perform an early exit of the dynamic analysis of the malware sample before the predetermined period of time based on monitoring of the malware sample during execution in the virtual computing environment; and
determine that the malware sample is benign.

14. The system recited in claim 1, wherein the processor is further configured to:
perform an early exit of the dynamic analysis of the malware sample before the predetermined period of time based on monitoring of the malware sample during execution in the virtual computing environment; and
determine that the malware sample is malicious.

15. A method, comprising:
initiating a dynamic analysis of a malware sample by executing the malware sample in a virtual computing environment for a predetermined period of time;
monitoring activities of the malware sample including launching a new process during the execution of the malware sample in the virtual computing environment; and
performing an early exit of the dynamic analysis of the malware sample before the predetermined period of time based on the monitoring of the activities of the malware sample during the execution of the malware sample in the virtual computing environment to determine that using all of the predetermined period of time for the dynamic analysis is not required to determine that the malware sample is malicious or benign based on one or more of the following:
(1) the malware sample cannot be executed in the virtual computing environment;
(2) the malware sample requires an external dependency that is not available in the virtual computing environment;
(3) the malware sample is associated with an unsupported file sub-type; and/or
(4) analysis of the new process of the malware sample has been completed.

16. The method of claim 15, wherein the virtual computing environment comprises a virtual machine instance.

17. A computer program product, the computer program product being embodied in a non-transitory tangible computer readable storage medium and comprising computer instructions for:
initiating a dynamic analysis of a malware sample by executing the malware sample in a virtual computing environment for a predetermined period of time;
monitoring activities of the malware sample including launching a new process during the execution of the malware sample in the virtual computing environment; and
performing an early exit of the dynamic analysis of the malware sample before the predetermined period of time based on the monitoring of the activities of the malware sample during the execution of the malware sample in the virtual computing environment to determine that using all of the predetermined period of time for the dynamic analysis is not required to determine that the malware sample is malicious or benign based on one or more of the following:
(1) the malware sample cannot be executed in the virtual computing environment;
(2) the malware sample requires an external dependency that is not available in the virtual computing environment;
(3) the malware sample is associated with an unsupported file sub-type; and/or
(4) analysis of the new process of the malware sample has been completed.

18. The computer program product recited in claim 17, wherein the virtual computing environment comprises a virtual machine instance.

* * * * *